United States Patent
Tran et al.

(10) Patent No.: US 9,820,117 B1
(45) Date of Patent: Nov. 14, 2017

(54) METHODS AND APPARATUS FOR ADVERTISING A SERVICE IN A WIRELESS NETWORK

(71) Applicant: Marvell International Ltd., Hamilton (BM)

(72) Inventors: Binh Quoc Tran, Los Altos, CA (US); Chor-Teck Law, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 75 days.

(21) Appl. No.: 14/643,776

(22) Filed: Mar. 10, 2015

Related U.S. Application Data

(60) Provisional application No. 61/952,087, filed on Mar. 12, 2014.

(51) Int. Cl.
*H04W 4/20* (2009.01)
*H04W 72/04* (2009.01)
*H04W 48/14* (2009.01)

(52) U.S. Cl.
CPC ............ *H04W 4/206* (2013.01); *H04W 48/14* (2013.01); *H04W 72/048* (2013.01)

(58) Field of Classification Search
None
See application file for complete search history.

(56) References Cited

U.S. PATENT DOCUMENTS

| | | | | |
|---|---|---|---|---|
| 6,532,368 B1* | 3/2003 | Hild | ...................... | G06Q 30/02 455/515 |
| 2002/0120750 A1* | 8/2002 | Nidd | ...................... | H04L 67/16 709/227 |
| 2004/0090924 A1* | 5/2004 | Giaimo | ................. | H04W 40/00 370/252 |
| 2005/0021725 A1* | 1/2005 | Lobbert | ................ | H04W 48/16 709/223 |
| 2014/0254566 A1* | 9/2014 | Qi | ......................... | H04W 56/00 370/336 |
| 2015/0381776 A1* | 12/2015 | Seed | ...................... | H04L 67/16 709/203 |

* cited by examiner

*Primary Examiner* — Fan Ng

(57) ABSTRACT

The present disclosure describes methods and apparatus for advertising a service in a wireless network via surrogacy. A principal (e.g., first) wireless communication device may request via a first wireless channel that an agent (e.g., second) wireless communication device (i) act as a surrogate and (ii) function in accordance with a social announcement scheme, which is associated with a second wireless channel, and with regard to a service that is available. The principal wireless communication device may have offered services or wanted services. The agent wireless communication device may perform an announcement operation with other wireless communication device(s) on behalf of the principal wireless communication device via the second wireless channel to discover or advertise a service that is available. The agent wireless communication device may report a result of the announcement operation, which result may include an identification of service(s) that are made available by other wireless communication device(s).

20 Claims, 7 Drawing Sheets

METHODS AND APPARATUS FOR ADVERTISING A SERVICE IN A WIRELESS NETWORK

CROSS REFERENCE TO RELATED APPLICATION

This present disclosure claims priority to U.S. Provisional Patent Application Ser. No. 61/952,087 filed Mar. 12, 2014, the disclosure of which is incorporated herein by reference in its entirety.

BACKGROUND

Wireless interconnectivity is becoming increasingly pervasive in a myriad of devices across many different environments. For example, pursuit of the so-called "internet of things" may result in wireless computing technology being embedded in many different types of objects, from shoes to refrigerators in consumer environments and from manufacturing equipment to inventory management containers in commercial environments. With the mushrooming of wireless interconnectivity, utilization of the finite electromagnetic spectrum generally, and usage of the limited resources of wireless communication devices individually, are becoming increasingly constrained.

SUMMARY

In general, in one aspect, this specification describes a first wireless communication device. The principal wireless communication device may include a transceiver and an announcement system. The transceiver may be configured to establish existence of a first wireless channel. The announcement system may be configured to determine a capability of a second wireless communication device to act as a surrogate for the first wireless communication device with respect to communication in a second wireless channel, wherein the first wireless communication device communicates with the second wireless communication device via the first wireless channel, and wherein the second wireless channel is associated with a social announcement scheme. The announcement system may further be configured, responsive to the second wireless communication device being able to act as a surrogate for the first wireless communication device with respect to communication in the second wireless channel, to: (i) request that the second wireless communication device perform an operation for the first wireless communication device over the second wireless channel in accordance with the social announcement scheme and with regard to a service that is available and (ii) receive from the second wireless communication device a result of the operation, wherein the result relates to the service that is available.

In general, in another aspect, this specification describes a second wireless communication device. The second wireless communication device may include a transceiver and an announcement system. The transceiver may be configured to establish existence of a first wireless channel and a second wireless channel. The announcement system may be configured to indicate, via the first wireless channel, a capability of the second wireless communication device to act as a surrogate for a first wireless communication device with respect to communication in the second wireless channel. The announcement system may also be configured to receive, from the first wireless communication device via the first wireless channel, a request to perform an operation for the first wireless communication device over the second wireless channel in accordance with a social announcement scheme associated with the second wireless channel. The announcement system may further be configured to: (i) perform the operation for the first wireless communication device in accordance with the social announcement scheme and with regard to a service that is available and (ii) report to the first wireless communication device via the first wireless channel a result of the operation, wherein the result relates to the service that is available.

In general, in yet another aspect, this specification describes a method implemented with a second wireless communication device. The method may include establishing existence of a first wireless channel and a second wireless channel. The method may also include (i) indicating, via the first wireless channel, a capability of the second wireless communication device to act as a surrogate for a first wireless communication device with respect to communication in the second wireless channel and (ii) receiving, from the first wireless communication device via the first wireless channel, a request to perform an operation for the first wireless communication device over the second wireless channel in accordance with a social announcement scheme associated with the second wireless channel. The method may further include (i) performing the operation for the first wireless communication device in accordance with the social announcement scheme and with regard to a service that is available and (ii) reporting to the first wireless communication device via the first wireless channel a result of the operation, wherein the result relates to the service that is available.

The details of one or more implementations are set forth in the accompanying drawings and the description below. Other features and advantages will be apparent from the description and drawings.

BRIEF DESCRIPTION OF THE DRAWINGS

In the figures, the left-most digit of a reference number identifies the figure in which the reference number first appears. The use of the same reference number in different instances in the description and the figures indicates like elements.

DETAILED DESCRIPTION

Figure 1:
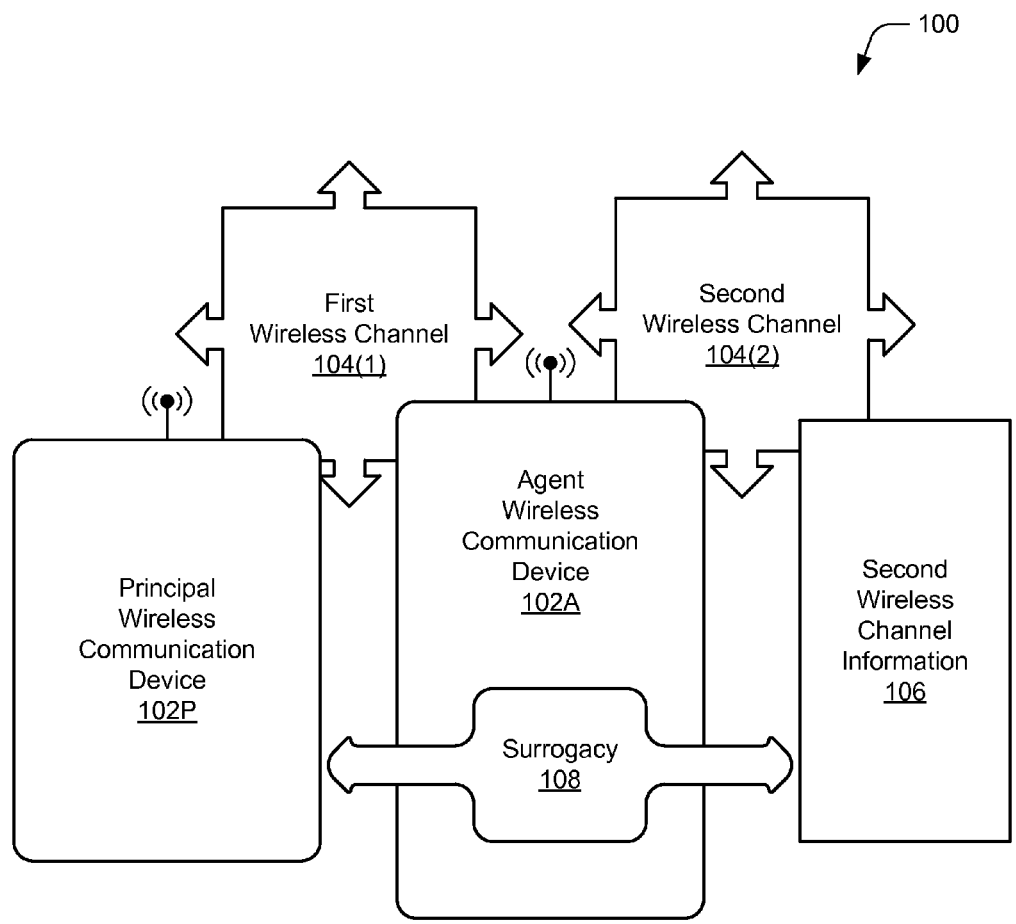
FIG. 1 depicts an example arrangement of wireless communication devices in accordance with one or more example embodiments.

Because of the finite nature of the electromagnetic spectrum, different approaches have been developed to facilitate efficient utilization of the spectrum. Example approaches include, but are not limited to, dividing the spectrum into different frequency bands, dividing communication time into different temporal segments, separating different communications by code, separating communications spatially with distance and/or beamforming, or combinations thereof. These and other approaches, including but not limited to implementation of different wireless communication standards or sub-parts thereof, which facilitate efficient spectrum utilization, may be considered to effectively create multiple different channels that may be used to communicate wirelessly. However, a given device typically has limited capacity for wireless communication inasmuch as device resources are finite. For instance, a number (e.g., one or more) of antennas, radios, receiver chains, assigned codes, processing bandwidth, directional beamforming, Wi-Fi chips, demodulators or filters, assigned time slots, etc. is or are finite. Consequently, a number of channel or channels that a given wireless communication device can simultaneously employ is typically limited.

From time to time a wireless communication device may be communicating on a first channel when the wireless communication device would also benefit from communicating on a second channel. For example, one type of data may be being continuously received via a first wireless communication channel, but another type or source of desired data is or is becoming available on a second wireless communication channel. Unfortunately, a situation may arise in which a wireless communication device does not have sufficient wireless capacity due to resource constraints to communicate on the second wireless channel without adversely impacting communication efforts on the first wireless channel. Adverse communication impacts may include, but are not limited to, being forced to reduce bandwidth throughput, completely ceasing communication, failing to receive desired data that was transmitted by another device, or a combination thereof on the first wireless channel.

For certain example embodiments as described herein, an agent wireless communication device may act as a surrogate for a principal wireless communication device such that the principal wireless communication device can obtain information available on a second wireless channel without departing from a first wireless channel. By way of example only, an agent wireless communication device (i) may communicate via a second wireless channel to glean information associated with the second channel and (ii) may report the information gleaned via the second wireless channel to a principal wireless communication device by communicating therewith via a first wireless channel. For certain example implementations, a first wireless communication channel may effectively instantiate or otherwise be associated with a first physical or logical wireless communication network, and a second wireless communication channel may effectively instantiate or otherwise be associated with a second physical or logical wireless communication network.

FIG. 1 depicts an example arrangement 100 of wireless communication devices 102 in which methods and apparatus for surrogacy 108 may be implemented in a social networking environment with regard to one or more wireless communication channels 104 in accordance with one or more example embodiments. As illustrated, example arrangement 100 includes multiple wireless communication devices 102, multiple wireless channels 104 for communication (or multiple wireless communication channels), second wireless channel information 106, and surrogacy 108. In particular, example arrangement 100 may include a principal wireless communication device 102P, an agent wireless communication device 102A, a first wireless channel 104(1), and a second wireless channel 104(2).

For certain example embodiments, agent wireless communication device 102A (e.g., a second wireless communication device) may function as a surrogate for principal wireless communication device 102P (e.g., a first wireless communication device) with respect to announcing second wireless channel information 106, which may include advertising or discovering information about second wireless channel 104(2) via a transmission or a reception on second wireless channel 104(2). Principal wireless communication device 102P and agent wireless communication device 102A may communicate with each other via first wireless channel 104(1). Agent wireless communication device 102A may also communicate via second wireless channel 104(2) to participate in at least one information announcement scheme with respect to second wireless channel information 106 on behalf of principal wireless communication device 102P. Participation in an information announcement scheme may include, but is not limited to, obtaining information, presenting information, or a combination thereof by receiving, transmitting, or a combination thereof via second wireless channel 104(2). Results of participation in an information announcement scheme may be reported to principal wireless communication device 102P by agent wireless communication device 102A via first wireless channel 104(1).

Via at least one handshake or negotiation protocol, principal wireless communication device 102P may request that agent wireless communication device 102A act as a surrogate for principal wireless communication device 102P with respect to second wireless channel information 106. If agent wireless communication device 102A agrees to do so in accordance with at least one approach to wireless communication channel surrogacy 108, principal wireless communication device 102P can avoid communicating via second wireless channel 104(2) (and perhaps continue communicating via first wireless channel 104(1) without interruption) and yet still at least indirectly participate in one or more schemes involving, supported by, or enabled with an announcement of second wireless channel information 106. By way of example only, second wireless channel information 106 may pertain to one or more services that may be shared as part of a social announcement scheme. A given wireless communication device 102 may function as a principal wireless communication device 102P at a particular moment or with respect to a particular other wireless communication device 102 but may function as an agent wireless communication device 102A at a different moment or with respect to a different other wireless communication device 102.

Figure 2:
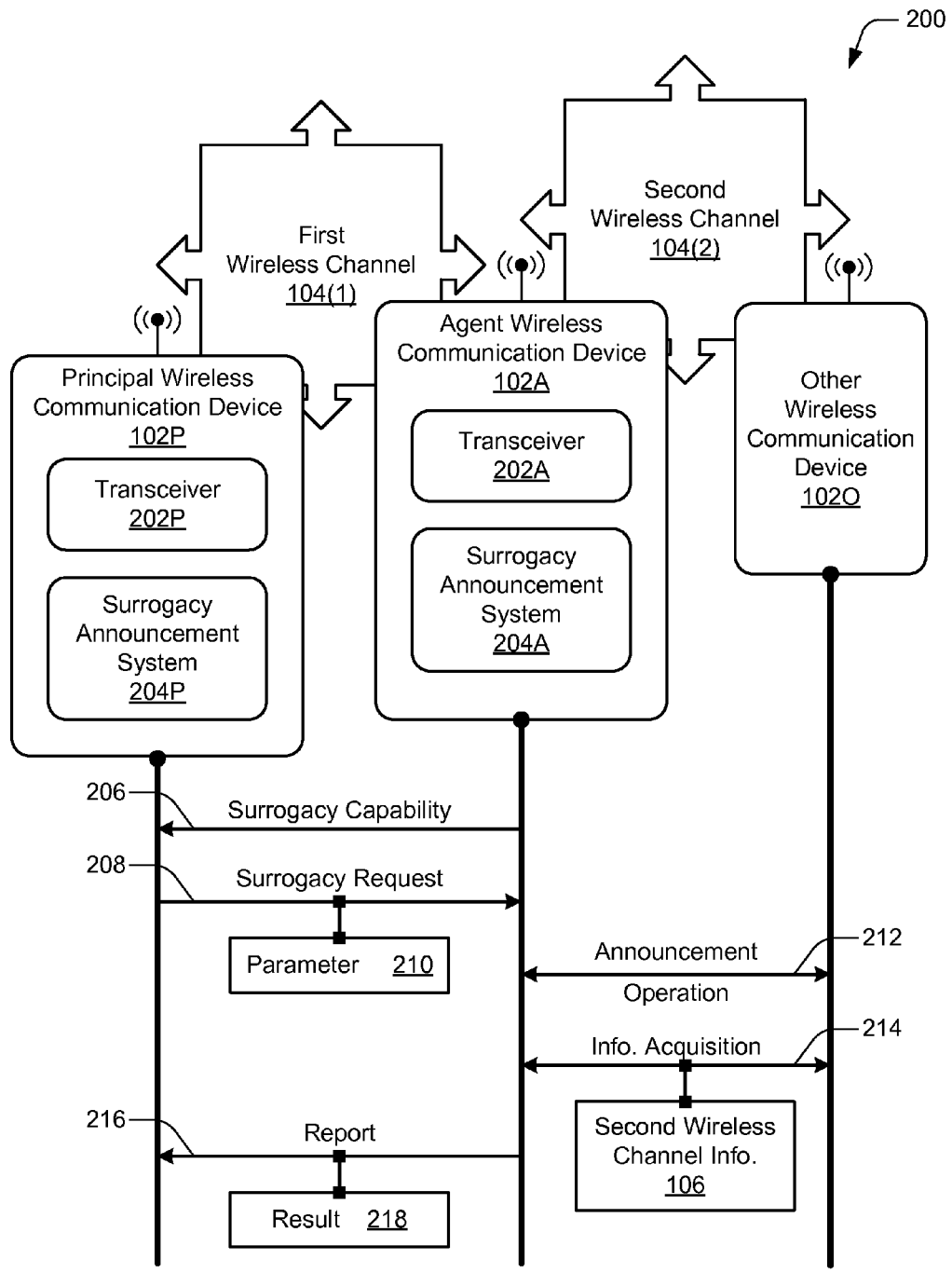
FIG. 2 illustrates an example arrangement of wireless communication devices in which one or more signals may be communicated between or among at least a principal wireless communication device and an agent wireless communication device in accordance with one or more example embodiments.

FIG. 2 illustrates an example arrangement 200 of wireless communication devices 102 in which one or more signals may be communicated between or among at least a principal wireless communication device 102P and an agent wireless communication device 102A in accordance with one or more example embodiments. As illustrated, arrangement 200 includes a principal wireless communication device 102P, an agent wireless communication device 102A, another wireless communication device 102O, a first wireless channel 104(1), a second wireless channel 104(2), and multiple signals. Specifically, arrangement 200 may further include signals that are related to messages 206, 208, or 216 or to at least one announcement operation 212 or information acquisition 214. Although shown in a particular example order in FIG. 2, messages or operations may occur in different orders, including partially or fully overlapping. Additionally, one or more wireless communication devices 102 may include at least one transceiver 202 or at least one surrogacy announcement system 204. Specifically, principal wireless communication device 102P may include at least one transceiver 202P and at least one surrogacy announcement system 204P, and agent wireless communication device 102A may include at least one transceiver 202A and at least one surrogacy announcement system 204A.

For certain example implementations, a transceiver 202 may include a transmitter, a receiver, a transmitter and a receiver, logic to operate a transmitter or receiver in accordance with (e.g., one or more physical, data link, or network layers of) at least one wireless standard for propagating signals, some combination thereof, or so forth. Surrogacy announcement system 204 may be configured to process (e.g., interpret, decode, formulate, generate, or a combination thereof) signals that have been received or that are to be transmitted, including but not limited to those that facilitate or otherwise pertain to a surrogacy information announcement scheme. Signals propagated between principal wireless communication device 102P and agent wireless communication device 102A may be communicated via first wireless channel 104(1). Signals propagated between agent wireless communication device 102A and other wireless communication device 102O may be communicated via second wireless channel 104(2). Although not explicitly shown in FIG. 2, other wireless communication device 102O may include at least one transceiver and at least an announcement system that facilitates sharing of second wireless channel information 106 (e.g., also of FIG. 1).

With continuing reference to FIG. 2, one or more surrogacy-related operations are described for certain example embodiments. Surrogacy-related operations may be performed by at least one of a surrogacy announcement system 204P (e.g., for a device serving in a principal role) or a surrogacy announcement system 204A (e.g., for a device serving in an agent role). As noted hereinabove, a single wireless communication device 102 may include both a surrogacy announcement system 204P and a surrogacy announcement system 204A (e.g., or a surrogacy announcement system 204 that includes capacity to operate as a principal, as an agent, or as either or both a principal and an agent).

For certain example operations, a principal wireless communication device 102P may indicate (not explicitly shown in FIG. 2) a desire for surrogacy to one or more potential (e.g., possible, within range, listening, surrogacy capable, or a combination thereof) agent wireless communication devices. A message 206 may indicate a surrogacy capability and may be transmitted from agent wireless communication device 102A to principal wireless communication device 102P via first wireless channel 104(1). Principal wireless communication device 102P may send a surrogacy request message 208 to agent wireless communication device 102A as part of at least one signal that is propagated wirelessly. A surrogacy request may include (e.g., reference, embed, identify, link to, or a combination thereof) at least one parameter 210 relating to a requested surrogacy. Examples of a parameter 210 may include, but are not limited to, a designation of second wireless channel 104(2), an indication of wanted second wireless channel information 106 (e.g., also of FIG. 1) (e.g., information—such as information about services—of second wireless channel 104(2) that is wanted by principal wireless communication device 102P), an identification of offered second wireless channel information 106 (e.g., information—such as information about services—for second wireless channel 104(2) that principal wireless communication device 102P intends to offer by making such services available), a stipulation of preferred timing for information exchange, or some combination thereof.

Via second wireless channel 104(2), an announcement operation 212 may be performed by at least one of (or between or among) agent wireless communication device 102A and at least one other wireless communication device 102O (e.g., those wireless communication device(s) that participate in an information announcement scheme associated with second wireless channel 104(2)). By way of example only, second wireless channel information 106 may be presented or may be obtained by agent wireless communication device 102A. For instance, agent wireless communication device 102A may present information that principal wireless communication device 102P desires to be made known with respect to second wireless channel 104(2) (e.g., "offered second wireless channel information"), or agent wireless communication device 102A may obtain from at least one other wireless communication device 102O information with respect to second wireless channel 104(2) that principal wireless communication device 102P wants to obtain (e.g., "wanted second wireless channel information"). In such a manner, an information acquisition operation 214 may be performed by at least one of agent wireless communication device 102A or other wireless communication device 102O with respect to second wireless channel information 106.

Second wireless channel information 106 may include, but is not limited to, one or more services that are offered or wanted by one or more wireless communication devices 102. One or more wireless communication devices may include those that are directly participating in a social information announcement scheme (e.g., agent wireless communication device 102A or other wireless communication device 102O) or those that are indirectly participating in a social information announcement scheme via a surrogacy relationship (e.g., principal wireless communication device 102P). Thus, agent wireless communication device 102A may acquire second wireless channel information 106 on behalf of principal wireless communication device 102P. Agent wireless communication device 102A may transmit to principal wireless communication device 102P via first wireless channel 104(1) one or more signals having a report message 216. A report may include (e.g., reference, embed, identify, link to, or a combination thereof) at least one result 218. By way of example only, a result 218 may indicate that agent wireless communication device 102A presented information that principal wireless communication device 102P desired to be presented via second wireless channel 104(2), may indicate what information agent wireless communication device 102A was able to obtain via second wireless channel 104(2), some combination thereof, or so forth.

Figure 3:
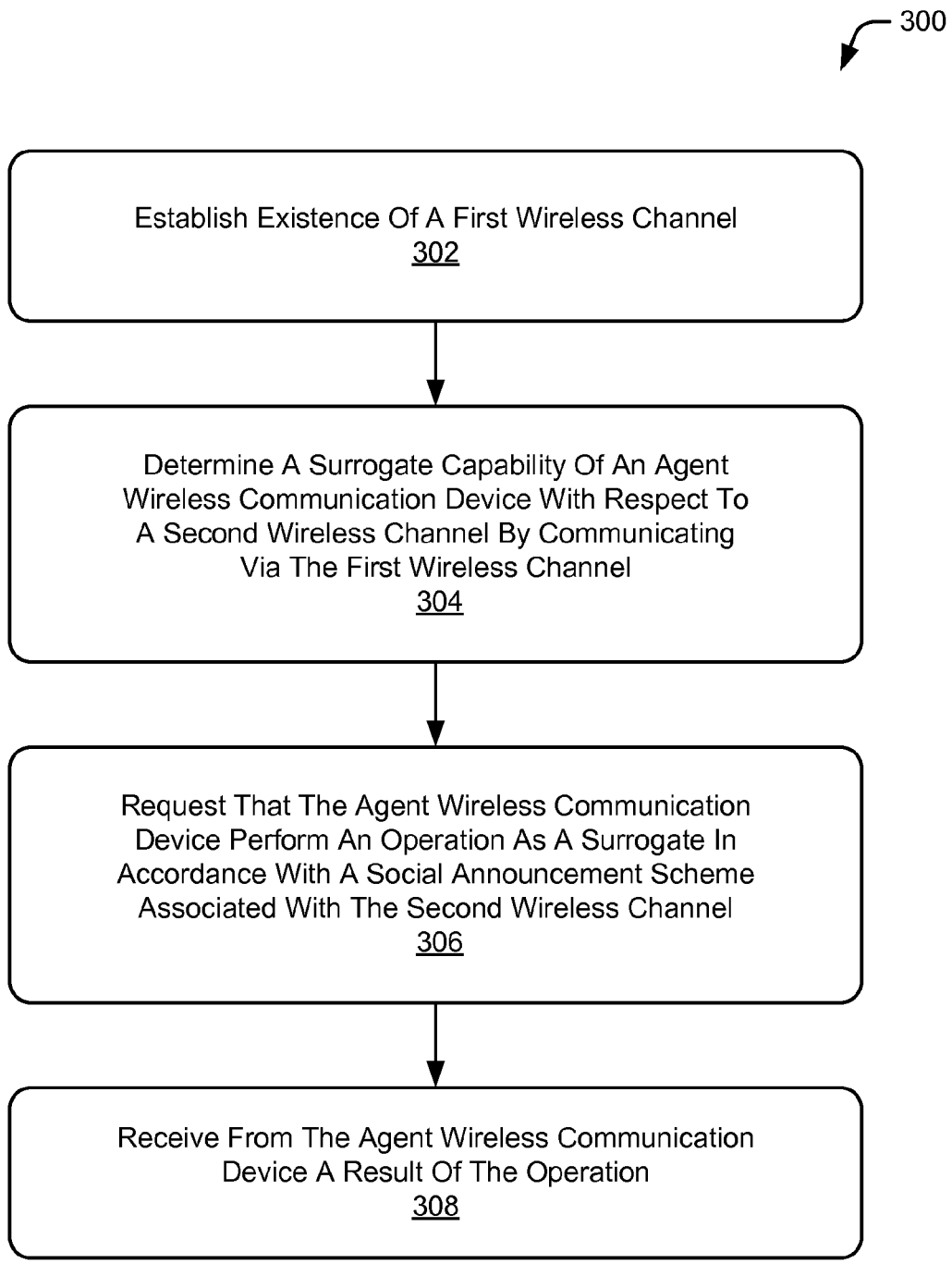
FIG. 3 is a flowchart illustrating an example process for wireless communication channel social surrogacy from a perspective of a principal wireless communication device in accordance with one or more example embodiments.

FIG. 3 is a flowchart illustrating an example process 300 for wireless communication channel social surrogacy from a perspective of a principal wireless communication device in accordance with one or more example embodiments. Process 300 is described in the form of a set of blocks 302-308 that specify operations that may be performed; however, operations are not necessarily limited to the order shown, for they may be implemented in alternative orders or in fully or partially overlapping manners. Operations represented by the set of blocks in process 300 may be performed by a first wireless communication device 102, such as a principal wireless communication device 102P of at least FIGS. 1 and 2, that is in communication with a second wireless communication device.

For certain example embodiments, a transceiver (e.g., a transceiver 202P of at least FIG. 2) may perform operation(s) of block 302, and a surrogacy announcement system (e.g., a surrogacy announcement system 204P of a least FIG. 2) may perform operation(s) of blocks 304-308. At block 302, existence of at least a first wireless channel may be established. For example, a principal wireless communication device may institute an infrastructure wireless network using a first wireless channel, may detect usage of—such as detection of at least one transmission by another on—a first wireless channel, may engage in usage of—such as initiating at least one transmission on—a first wireless channel, some combination thereof, or so forth.

At block 304, a surrogate capability of an agent wireless communication device may be determined with respect to a second wireless channel using at least one communication with the agent wireless communication device via the first wireless channel, with the second wireless channel being associated with a social announcement scheme. For example, a principal wireless communication device may receive via a first wireless channel a message or may process a message from an agent wireless communication device that indicates a capability of the agent wireless communication device to act as a surrogate for the principal wireless communication device with respect to communication in a second wireless channel (e.g., that indicates a capability to serve as a surrogate on a second wireless channel so as to obtain or present identification of services that are available or that are being shared via the second wireless channel).

For certain example embodiments, operation(s) of block 306 or block 308 may be performed responsive to a determination that the agent wireless communication device is able to act as a surrogate for the principal wireless communication device with respect to communication in the second wireless channel. At block 306, the agent wireless communication device may be requested to perform at least one operation as a surrogate for the principal wireless communication device in accordance with the social announcement scheme associated with the second wireless channel with regard to one or more services that are available. For example, a principal wireless communication device may transmit a request on a first wireless channel. The request may include one or more identified services that are offered by the principal wireless communication device or one or more indicated services that are wanted by the principal wireless communication device. Based on the request, an agent wireless communication device may attempt via a second wireless channel to present one or more identified services that are offered by the principal wireless communication device or to obtain discovery of one or more indicated services that are wanted by the principal wireless communication device or offered by at least one other wireless communication device.

At block 308, one or more results of the at least one operation may be received from the agent wireless communication device, with the one or more results relating to the one or more services that are available. For example, a principal wireless communication device may receive via a first wireless channel (i) one or more identifications of one or more services that were discovered via a second wireless channel to be offered by at least one other wireless communication device or (ii) at least one confirmation that one or more services that are offered by the principal wireless communication device were advertised via the second wireless channel.

Figure 4:
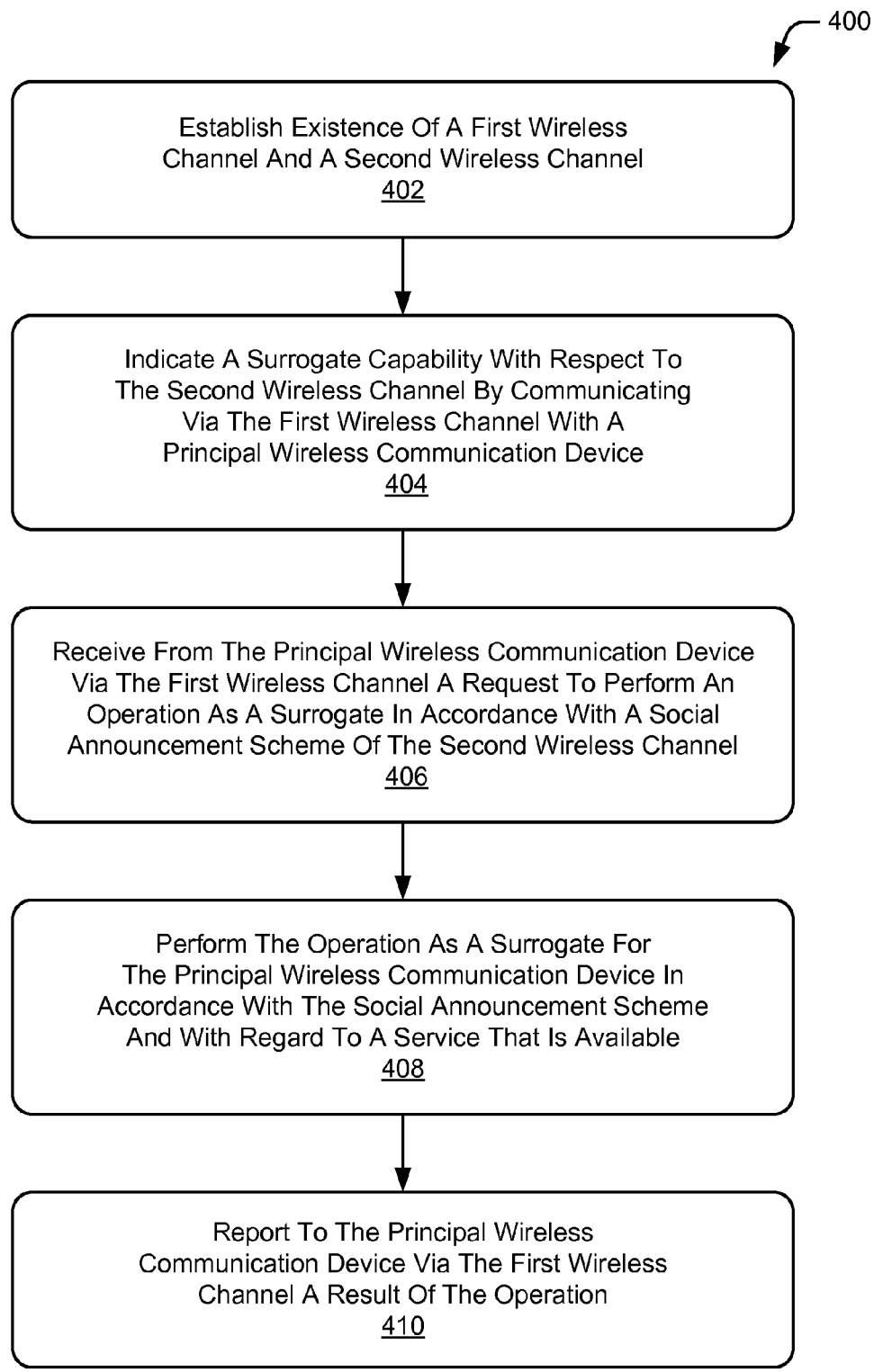
FIG. 4 is a flowchart illustrating an example process for wireless communication channel social surrogacy from a perspective of an agent wireless communication device in accordance with one or more example embodiments.

FIG. 4 is a flowchart illustrating an example process 400 for wireless communication channel social surrogacy from a perspective of an agent wireless communication device in accordance with one or more example embodiments. Process 400 is described in the form of a set of blocks 402-410 that specify operations that may be performed; however, operations are not necessarily limited to the order shown, for they may be implemented in alternative orders or in fully or partially overlapping manners. Operations represented by the set of blocks in process 400 may be performed by a second wireless communication device 102, such as an agent wireless communication device 102A of at least FIGS. 1 and 2, that is in communication with a first wireless communication device.

For certain example embodiments, a transceiver (e.g., a transceiver 202A of at least FIG. 2) may perform operation(s) of block 402, and a surrogacy announcement system (e.g., a surrogacy announcement system 204A of a least FIG. 2) may perform operation(s) of blocks 404-410. At block 402, existence of at least a first wireless channel and a second wireless channel may be established. For example, an agent wireless communication device may demodulate a signal detected via a first wireless channel, transmit a signal over the air in a manner comporting with a second wireless channel, receive a message via a second wireless channel, some combination thereof, or so forth.

At block 404, a surrogate capability of the agent wireless communication device may be indicated with respect to the second wireless channel using at least one communication with a principal wireless communication device via the first wireless channel. For example, an agent wireless communication device may transmit to a principal wireless communication device on a first wireless channel a message including an affirmative surrogacy indicator (e.g., a code, a set bit, a particular message format, a standardized content for a field of a message, or a combination thereof) that indicates a capability of the agent wireless communication device to act as a surrogate for the principal wireless communication device with respect to communication in the second wireless channel. A relevant second wireless channel may be indicated explicitly or implicitly as part of or separate from an affirmative surrogacy indicator. For instance, a given wireless standard may establish a particular channel for surrogacy or information announcement purposes. Alternatively, a second wireless channel may be negotiated between a principal wireless communication device and an agent wireless communication device.

At block 406, a request to perform at least one operation as a surrogate for the principal wireless communication device in accordance with a social announcement scheme associated with the second wireless channel may be received from the principal wireless communication device via the first wireless channel. For example, a message received from a principal wireless communication device via a first wireless channel may request that an agent wireless communication device act as a surrogate for the principal wireless communication device by representing the principal wireless communication device while participating in a services announcement (e.g., advertisement, discovery, or a combination thereof) protocol or procedure via a second wireless channel on behalf of (e.g., in accordance with at least one parameter from, broadcasting offered services of, filtering for services wanted by, or a combination thereof) the principal wireless communication device.

At block 408, the at least one operation as a surrogate for the principal wireless communication device may be performed in accordance with the social announcement scheme associated with the second wireless channel with regard to one or more services that are available. For example, an agent wireless communication device may present one or more identified services that are offered by a principal wireless communication device, may obtain knowledge (e.g., whether or if there is availability, how or where to access, or a combination thereof) regarding one or more indicated services that are wanted by the principal wireless communication device, or a combination thereof, etc. via a second wireless channel in a manner comporting with a protocol for sharing at least information about one or more services.

At block 410, one or more results of the at least one operation may be reported to the principal wireless communication device via the first wireless channel, with the one or more results relating to the one or more services that are available. For example, an agent wireless communication device may send a message to a principal wireless communication device via a first wireless channel that identifies one or more services that are available from other wireless communication devices—which identified services may have been filtered by at least one indication of at least one service that is wanted by the principal wireless communication device, may signal success (or failure) via a first wireless channel with respect to an attempt to present at least one service that the principal wireless communication device had previously identified as being capable of offering, some combination thereof, or so forth.

The example techniques and approaches described herein support various different usage scenarios. For example, they may be implemented in a Wi-Fi scenario. More specifically, but by way of example only, they may be implemented by an access point (AP) (e.g., a Wi-Fi AP) or by at least one client station of an AP. In certain wireless networking environments—such as in Wi-Fi networks, neighbor awareness networking (NAN) may be implemented. With NAN, social networking may be at least partially standardized so as to facilitate relatively faster discovery or advertising of services within proximity (e.g., within radio range) of a wireless node. An example standardized approach to NAN in Wi-Fi networks in particular (e.g., a device or network that is so-called "Wi-Fi Aware" as per the Wi-Fi Alliance) may entail having participants switch to a pre-defined channel (e.g., channel 6 for 2.4 GHz or channel 44 or 149 for 5 GHz). This may adversely impact the performance of an AP that attempts to participate in Wi-Fi social networking because a consequence of such participation would be that the AP switches away from an AP operating channel (e.g., channel 11) and to a social channel (e.g., channel 6 for a 2.4 GHz example) for some interval of time. Such a channel switching may be performed periodically, perhaps as frequently as each 512 transmission units (TUs). A periodic or frequent switching would likely disrupt AP services, especially because traditional Wi-Fi standards, and thus equipment that was built to comport with such standards, fail to include a native mechanism in AP services for an AP to notify associated client stations that the AP will be unavailable for period of time. With a social surrogacy mechanism, on the other hand, an AP may be enabled to at least indirectly participate in social networking without disrupting AP services.

In one or more example usage scenarios for social surrogacy, an AP may piggyback participation in a Wi-Fi social network by using an associated client station as a surrogate. An AP may advertise a desire to at least indirectly participate in a Wi-Fi social network with, for instance, a beacon or a probe response (e.g., that is signifying NAN). A client station, if associating to an AP, may indicate to the AP that it is capable of participating in NAN or serving as a surrogate as part of NAN capability. A client station may submit an indication of this capability in, for instance, an association request message. In response to received NAN indications, an AP may record NAN-capable client stations in a list. An AP may ask at least one of the listed NAN-capable client stations to participate in a NAN cluster on behalf of the AP and to report results to the AP. An AP may inform a selected client station of what service type(s) an AP wants (e.g., is interested in) so that the client station can filter for the indicated services (e.g., separately from or along with those service type(s) that the client station is interested in). Additionally or alternatively, an AP may inform (e.g., identify to) a selected client station of what service(s) the AP is capable of offering so that the client station may advertise this service availability in the NAN cluster. Informing a client station of wanted services or offered services by the AP may be accomplished using, for instance, one or more action frames.

Continuing with one or more example usage scenarios for social surrogacy, a client station may notify the AP that the client station is going to sleep (e.g., via a power save (PS) Poll message with a PS bit set to "1"), which notification may be sent as early as at a next available period for the client station to participate in a NAN-based communication. After sending the notification, the client station (i) may switch from an AP operating channel to a social channel and (ii) may follow NAN protocol to participate in NAN. A NAN-capable client station may listen on a social channel to collect information about what services are being provided by other wireless communication devices that are in proximity. Additionally or alternatively, a NAN-capable client station may advertise what service(s) are made available (e.g., by the NAN-capable client station, by the AP on whose behalf the NAN-capable client station is participating in the NAN, by a different wireless communication device for which the NAN-capable client station is functioning as a surrogate, or a combination thereof). One or more characteristics of an identified service that is being advertised may be provided. Example characteristics (e.g., for a Wi-Fi related service) may include, but are not limited to, a type of service (e.g., a label, a title, a description (e.g., printing, internet access, access to backup storage, access to camera or microphone, possession of a particular security authentication or authorization, or a combination thereof), an indication of corresponding resource(s), or a combination thereof), a Basic Service Set Identifier (BSSID) (e.g., for IEEE 802.11 wireless networking), a channel a service is on, or some combination thereof. After performing one or more NAN-related operations, a client station (i) may switch from a social channel back to an AP operating channel and (ii) may notify the AP of a return or an awakened state (e.g., via a PS Poll message with a PS bit set to "0"). A client station may report NAN-related information that was discovered on the NAN duster to the AP (e.g., via one or more action frames exchanges).

By implementing one or more example usage scenarios for social surrogacy, an AP may at least indirectly participate in NAN or another Wi-Fi social network without having to cease communication on an operating channel and therefore without causing an appreciable level of service disruption. Moreover, congestion on a social channel may be reduced inasmuch as social surrogacy may obviate the presence of APs on social channels.

As described hereinabove, channels for electromagnetic communication may be created using any one or more of many different approaches to dividing available communication resources. Examples include, but are not limited to, dividing available frequency spectrum into multiple frequency bands, dividing available time into multiple time slots, dividing available geospatial territory into different spatial divisions (e.g., with cellular reuse, directionality, beamforming, or a combination thereof), dividing available spread spectrum into different spreading codes, or some combination thereof. As noted hereinabove, a Wi-Fi standard at 2.4 GHz segregates a social networking channel 6 from an operational channel 11. Operational channel 11 and social networking channel 6 are non-overlapping channels at 2462 MHz and 2437 MHz, respectively, and are differentiated using Direct Sequence Spread Spectrum (DSSS) or Orthogonal Frequency Division Multiplexing (OFDM). By way of example but not limitation, an implementation of wireless communication channel social surrogacy in conjunction with at least one Wi-Fi network is described below with particular reference to FIG. 5 and FIG. 6.

Figure 5:
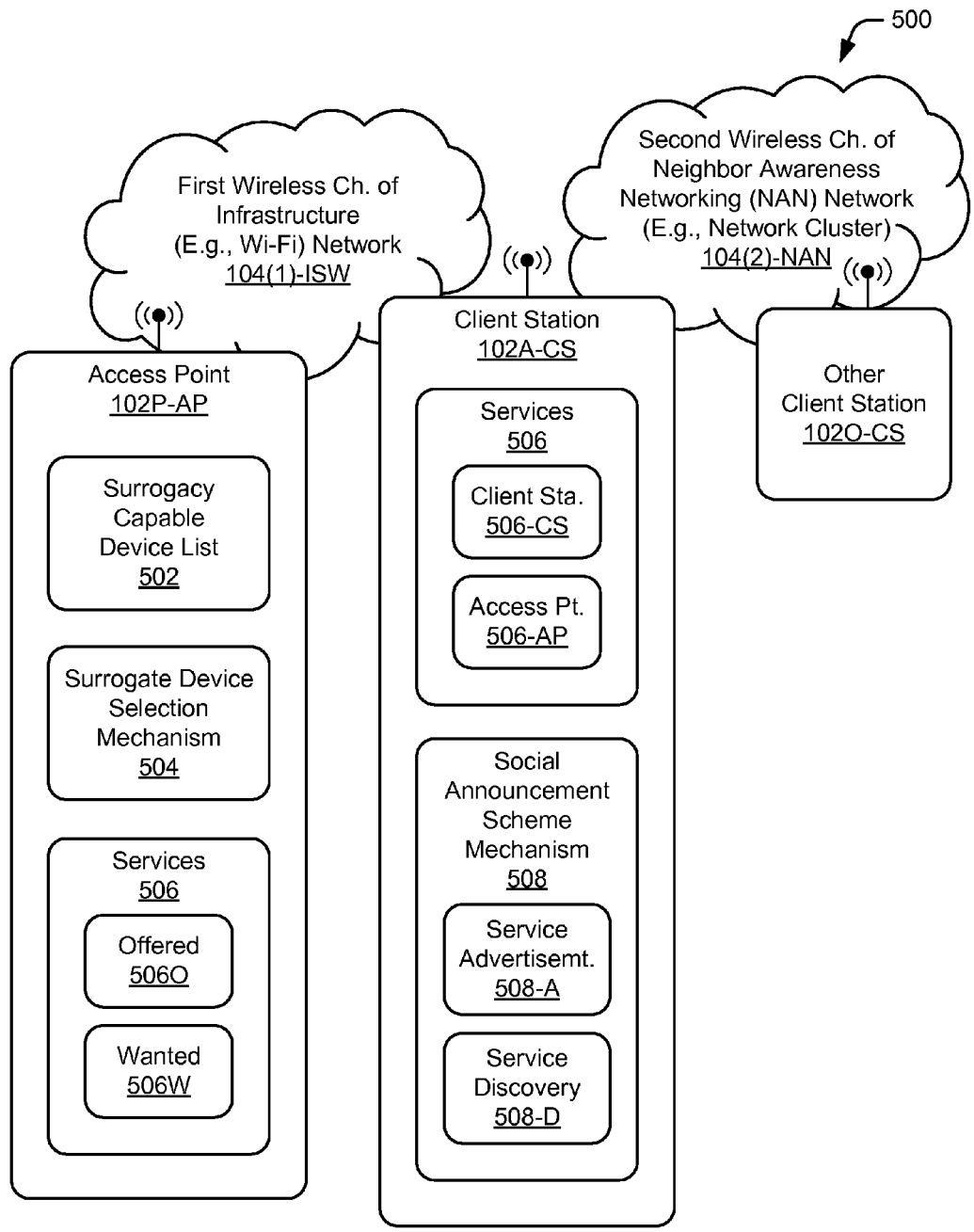
FIG. 5 depicts aspects of an example implementation including an access point and a client station with at least one Wi-Fi network in accordance with one or more example embodiments.

FIG. 5 depicts aspects of an example implementation 500 including an access point (AP) 102P-AP and a client station (CS) 102A-CS with at least one Wi-Fi network in accordance with one or more example embodiments. As illustrated, implementation 500 includes an AP 102P-AP, a client station 102A-CS, another client station 102O-CS, a first wireless channel of an infrastructure network 104(1)-ISW, and a second wireless channel of a NAN network 104(2)-NAN. An infrastructure network (e.g., for Wi-Fi) may be instituted by an AP 102P-AP using a first wireless channel (e.g., as part of a Basic Service Set (BSS) mode). A NAN network may be realized from multiple client stations intercommunicating to form at least one network cluster (e.g., in an ad-hoc mode).

For certain example implementations, an AP 102P-AP may function at least as a principal wireless communication device 102P (e.g., of at least FIGS. 1 and 2). AP 102P-AP may include at least one surrogacy capable device list 502, at least one surrogate device selection mechanism 504, or one or more services 506. A surrogacy capable device list 502 may identify (e.g., by device name, by address—such as a media access control (MAC) address, or a combination thereof) one or more devices (e.g., client stations) that have indicated a capability to perform as a surrogate at least with respect to a social network. Surrogacy capable device list 502 may be constituted or realized in any of multiple possible manners. Example manners include, but are not limited to, a separate list of surrogacy capable devices, a list that is integrated with a list of currently or previously associated client stations (e.g., with a field for each entry indicative of surrogacy capability), a database, a table, or some combination thereof.

A surrogate device selection mechanism 504 may include one or more approaches (e.g., algorithm, threshold, parameter, criterion, or a combination thereof) for selecting a device for surrogacy from between or among those included as part of surrogacy capable device list 502. Example selection mechanisms may include, but are not limited to, selecting a device with a better or superior signal (e.g., based on signal strength, bandwidth or throughput, signal-to-noise ratio, or a combination thereof), selecting a device that is not operating on battery power, selecting a device that has a minimum percentage of remaining battery power or battery time, selecting a device that has more/most or a greater/greatest remaining battery power or battery time, having a selection preference for a device that is not currently transceiving real-time data or that is adequately buffered, considering whether a device is already participating in a relevant social network, factoring in manufacturer or model preference, considering device type preference (e.g., printer vs. mobile phone vs. refrigerator), factoring into a selection whether a device is currently being interacted with or otherwise utilized by an end user (e.g., whether a human user will be impacted by surrogacy), prioritizing a mobile device over a stationary device—or vice versa, weighing relative quality of service (QoS) requests from client stations (e.g., a client station with a lower requested QoS may be selected), or some combination thereof.

An AP 102P-AP may include one or more services 506. Services 506 may include one or more offered services 506O, one or more wanted services 506W, some combination thereof, or so forth. Offered services 506O may, for example, identify one or more services that AP 102P-AP is capable of providing or willing to provide to another wireless communication device, such as client station 102A-CS or another client station 102O-CS. Wanted services 504W may, for example, indicate one or more services that AP 102P-AP is interested in learning about (e.g., because it may wish to utilize such a service, because it is attempting to "map" proximate services within range of its AP signal, or a combination thereof). In an example operation, AP 102P-AP may communicate to a would-be surrogate (e.g., client station 102A-CS) one or more offered services 506O, one or more wanted services 506W, or a combination thereof, etc. so that the would-be surrogate may perform at least one social announcement on behalf of AP 102P-AP with respect to relevant one(s) of services 506.

For certain example implementations, a client station 102A-CS may function at least as an agent wireless communication device 102A (e.g., of at least FIGS. 1 and 2). Client station 102A-CS may include one or more services 506 or at least one social announcement scheme mechanism 508. Services 506 may include one or more client station services 506-CS, one or more AP services 506-AP, some combination thereof, or so forth. AP services 506-AP may include one or more offered services 506O, one or more wanted services 506W, or a combination thereof, etc. (e.g., as described above with particular reference to AP 102P-AP) for an AP for which client station 102A-CS has agreed or has been requested to function as a surrogate. Client station 102A-CS may identify one or more services that client station 102A-CS is capable of providing or willing to provide to another wireless communication device, such as AP 102P-AP or another client station 102O-CS. Thus, client station services 506-CS may include services that are offered by client station 102A-CS, services that are wanted by client station 102A-CS, some combination thereof, or so forth.

A social announcement scheme mechanism 508 may enable client station 102A-CS to participate in a social announcement scheme by, for example, sharing information about available services. Social announcement scheme mechanism 508 may include a service advertisement mechanism 508-A, a service discovery mechanism 508-D, some combination thereof, or so forth. A service advertisement mechanism 508-A may, for example, configure client station 102A-CS to advertise to one or more other client stations 102O-CS those services that are made available by client station 102A-CS or that are made available by AP 102P-AP (e.g., if client station 102A-CS is functioning as a surrogate for AP 102P-AP). A service discovery mechanism 508-D may, for example, configure client station 102A-CS to discover from one or more other client stations 102O-CS those services that are made available by other client station(s) 102O-CS. Discovered services may be filtered by a list of services that are wanted by client station 102A-CS (e.g., which may be located at or stored as part of client station services 506-CS), by a list of services that are wanted by AP 102P-AP (e.g., which may be located at or stored as part of AP services 506-AP) (e.g., if client station 102A-CS is functioning as a surrogate for AP 102P-AP), some combination thereof, or so forth.

In one or more example embodiments as described herein, wireless communication channel social surrogacy may use, or may be implemented in an environment having, at least one communication protocol that is compliant with Wi-Fi networks, such as a network implementing or comporting with at least a portion of an IEEE 802.11 standard (e.g., as discussed in the IEEE Std. 802.11-2012, Mar. 29, 2012). A surrogacy announcement system 204 (e.g., of at least FIG. 2) may function in accordance with one or more of various modes of operation that are compliant with an IEEE 802.11 standard, such as Basic Service Set (BSS), Independent Basic Service Set (IBSS), NAN (Neighbor Awareness Networking), some combination thereof, or so forth. Although reference is made herein to an IEEE 802.11 standard or various aspects thereof (e.g., especially with regard to FIG. 5 above or FIG. 6 below), the techniques and approaches described herein may additionally or alternatively be implemented using one or more other (e.g., wireless) standards or signaling technologies, including but not limited to those that enable or permit two or more wireless channels of communication.

Figure 6:
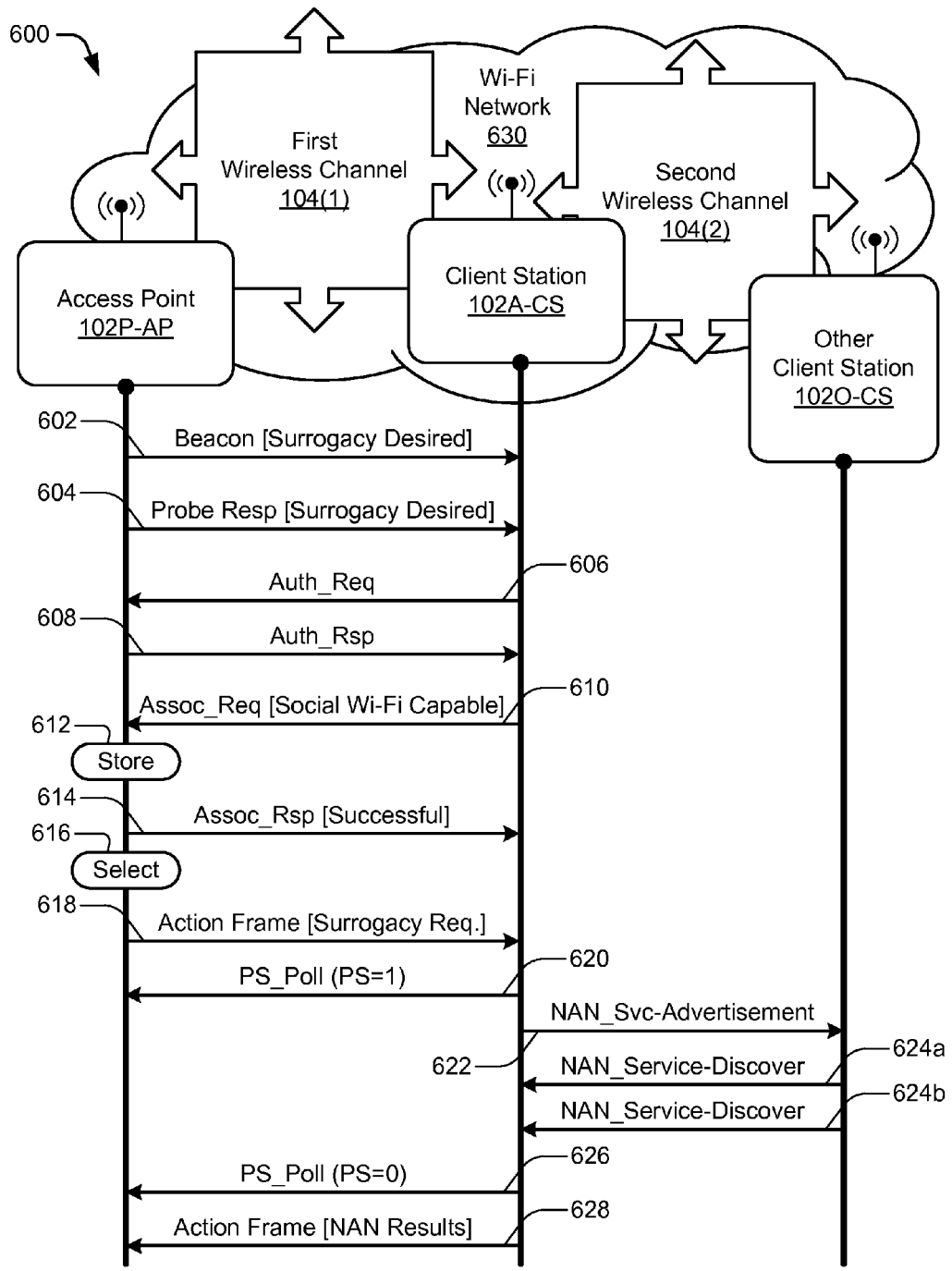
FIG. 6 illustrates aspects of an example implementation in which one or more signals may be communicated between or among at least an access point and a client station via at least one Wi-Fi network in accordance with one or more example embodiments.

FIG. 6 illustrates aspects of an example implementation 600 in which one or more signals may be communicated between or among at least an access point 102P-AP and a client station 102A-CS via at least one Wi-Fi network 630 in accordance with one or more example embodiments. As illustrated, implementation 600 includes an AP 102P-AP, a client station 102A-CS, another client station 102O-CS, a first wireless channel 104(1), a second wireless channel 104(2), multiple signals, and at least one Wi-Fi network 630. Implementation 600 may include signals that are related to messages 602-610, 614, or 618-628 or to operations 612 or 616. Signals propagated between AP 102P-AP and client station 102A-CS may be communicated via first wireless channel 104(1). Signals propagated between client station 102A-CS and one or more other client stations 102O-CS may be communicated via second wireless channel 104(2).

Although shown in a particular example order in FIG. 6, messages or operations may occur in different orders, including partially or fully overlapping. Although not explicitly shown in FIG. 6, AP 102P-AP, client station 102A-CS, or one or more other client stations 102O-CS may include at least one transceiver 202 or at least one surrogacy announcement system 204 (e.g., as shown at least in FIG. 2 and described hereinabove). Although first wireless channel 104(1) and second wireless channel 104(2) are shown as both being associated with at least one Wi-Fi network 630, each may alternatively be associated with a single different network, or each may respectively alternatively be associated with a respective different network.

For certain example implementations, messages may be exchanged (e.g., sent from one and received at another) (i) between AP 102P-AP and client station 102A-CS or (ii) between client station 102A-CS and other client station 102O-CS. A beacon 602, which includes a surrogacy desired indicator, may be broadcast by AP 102P-AP for one or more client stations that are in a passive scan mode. A probe response 604, which includes a surrogacy desired indicator, may be sent by AP 102P-AP to at least one client station that is in an active scan mode and that previously transmitted a probe request. Hence, client station 102A-CS may receive an indication that AP 102P-AP desires a client station to act as a surrogate via at least one of a beacon or a probe response.

To join an AP, or an infrastructure network thereof, an authentication procedure may be performed between a client station and the AP. An authentication request 606 may be sent from client station 102A-CS to AP 102P-AP. AP 102P-AP may transmit an authentication response 608 to client station 102A-CS. To enable data transfer, a client station typically becomes associated with or to an AP using at least one protocol handshake. Client station 102A-CS may therefore transmit an association request frame 610 to AP 102P-AP, with association request frame 610 including an indication that the client station is social Wi-Fi capable. At operation 612, AP 102P-AP may store at least one identification of client station 102A-CS (e.g., as part of a surrogacy capable device list 502 (e.g., of FIG. 5)). After receiving association request 610, AP 102P-AP may transmit an association response frame 614 with a successful association indication.

At some time, AP 102P-AP may perform a selection operation 616 to select client station 102A-CS for social surrogacy support (e.g., in accordance with a surrogate device selection mechanism 504 and in conjunction with a surrogacy capable device list 502 (e.g., as described hereinabove with particular reference to FIG. 5)). AP 102P-AP may transmit an action frame 618 with a surrogacy request to client station 102A-CS. To notify AP 102P-AP that client station 102A-CS will engage in at least a temporary cessation of communication (e.g., in order to switch channels to perform at least one social announcement operation), client station 102A-CS may transmit to AP 102P-AP a power saving polling message 620 with a power save (PS) indicator set to "1" so as to initiate an impending procedure to leave first wireless channel 104(1). Client station 102A-CS may switch from transceiving via first wireless channel 104(1) to transceiving via second wireless channel 104(2).

For certain example implementations, client station 102A-CS may participate in a social network by performing one or more operations via second wireless channel 104(2) in accordance with a social announcement scheme with regard to one or more services that are available. If client station 102A-CS advertises one or more services that AP 102P-AP makes available or attempts to discover at least one service that AP 102P-AP wants to be available (from another device), client station 102A-CS may serve as a surrogate on behalf of AP 102P-AP. For message 622, client station 102A-CS may transmit at least one NAN service advertisement to one or more other client stations 102O-CS with one or more advertisements identifying at least one service that client station 102A-CS or AP 102P-AP makes available. To obtain which one or more services are made available by other client stations 102O-CS, client station 102A-CS may receive one or more NAN service discovery messages, such as NAN service discovery message 624a or NAN service discovery message 624b, from one or more other client station 102O-CS. Client station 102A-CS may filter services advertised by other client stations 102O-CS based on one or more indications of services wanted by AP 102P-AP or services wanted by client station 102A-CS (e.g., based at least partially on AP services 506-AP, client station services 506-CS, or a combination thereof (e.g., as described hereinabove with particular reference to FIG. 5)).

Client station 102A-CS may switch from transceiving via second wireless channel 104(2) "back" to transceiving via first wireless channel 104(1). To notify AP 102P-AP that client station 102A-CS is returning to communication (e.g., after performing at least one social announcement operation), client station 102A-CS may transmit a power saving polling message 626 with a PS indicator set to "0" to AP 102P-AP. To report results of a social announcement operation, client station 102A-CS may transmit to AP 102P-AP at least one action frame 628 having one or more NAN results. NAN results sent by client station 102A-CS and received by AP 102P-AP may include, but are not limited to, an indication that services offered by AP 102P-AP were advertised by client station 102A-CS to a NAN cluster, an indication that services offered by AP 102P-AP failed to be advertised, at least one identification of one or more services that are offered by one or more other client stations 102O-CS, or some combination thereof.

Figure 7:
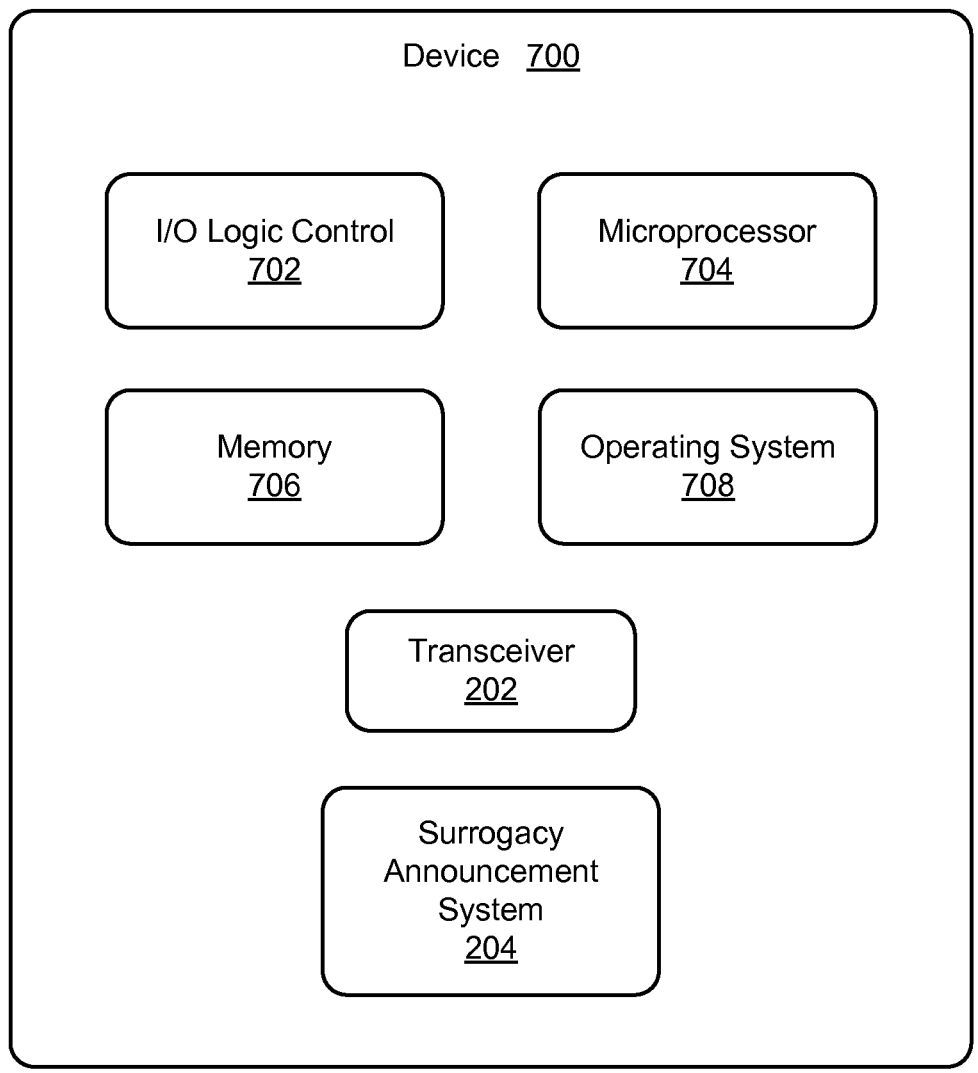
FIG. 7 depicts an example device that can implement various aspects of the mechanisms and processes described herein.

FIG. 7 depicts an example device 700 that can implement various aspects of the mechanisms and processes described herein. For certain example embodiments, device 700 may be realized as any one or more of a variety of different devices, including but not limited to, a media device, a computer device, a television set-top box, a video processing and/or rendering device, an Ethernet interface, a switch, an access point (AP), a home appliance device, a gaming device, an electronic device, a vehicle, a workstation, a smart phone, a tablet, a printer, a home automation device, a security or safety device such as a camera or fire detector or door lock, a wearable such as a smart watch or intelligent glasses, a Wi-Fi chip, another type of computing device, or some combination thereof. Device 700 may be implemented as a System-on-Chip (SoC).

For certain example implementations, device 700 may include electronic circuitry, which has at least one hardware component or tangible aspect; at least one microprocessor; at least one memory; input-output (I/O) logic control; one or more modules; one or more communication interfaces or components; other hardware, firmware, or software applicable to enabling a device to function; some combination thereof; or so forth. Device 700 may also include at least one integrated data bus (not explicitly shown in FIG. 7) that couples various components of the device for data communication between or among the various components. A wireless communication device that comprises device 700 or includes device 700 as a sub-part thereof may be implemented with many combinations of differing components.

Continuing with FIG. 7, example device 700 as illustrated may include various components such as an input-output (I/O) logic control 702 (e.g., which may include electronic circuitry) or a microprocessor 704 (e.g., at least one of a microcontroller, a digital signal processor (DSP), a power-efficient mobile-oriented processing unit, or a combination thereof). Device 700 may also include at least one memory 706, which may include any one or more types of memory, such as random access memory (RAM), low-latency non-volatile memory (e.g., Flash memory), read only memory (ROM), one-time programmable memory, other suitable electronic data storage, some combination thereof, or so forth. By way of example only, memory 706 may include one or more tangible or non-transitory storage media. Additionally or alternatively, device 700 may include a memory interface for accessing supplementary or removable or expandable off-chip memory, such as an external Flash memory module. Device 700 may also include various stored, executable, or executing firmware or software, such as an operating system 708, which may include computer-executable instructions maintained by memory 706 and executed by microprocessor 704. Device 700 may also include other various communication interfaces; communication components; other hardware, firmware, or software; some combination thereof; or so forth. An example of a communication component may include, but is not limited to, at least one transceiver 202 (e.g., which is described herein above as at least one of a transceiver 202P or a transceiver 202A with particular reference to at least FIG. 2).

Example device 700 may also include a surrogacy announcement system 204 that enables at least one of a principal surrogacy functionality or an agent surrogacy functionality to be implemented as described herein. A surrogacy announcement system 204 is explicitly illustrated in FIG. 2. However, various example implementations or aspects of a surrogacy announcement system 204 are described hereinabove with reference to any one or more of FIGS. 1-6. A surrogacy announcement system 204 may be implemented in hardware, firmware, software, combinations thereof, or so forth.

One or more of the example methods or techniques or processes that are described hereinabove may take the form of at least one computer program product that is accessible from a computer-usable or computer-readable medium providing program code for use by or in connection with a computer or any instruction execution system. For purposes of this description, a computer-usable or computer-readable medium may be any apparatus that can tangibly store a program for use by or in connection with an instruction execution system, apparatus, or device. A medium may be an electronic, magnetic, optical, electromagnetic, infrared, semiconductor, or a combination thereof, etc. system (or apparatus or device or article of manufacture). Examples of a computer-readable medium may include, but are not limited to, a semiconductor or solid state memory, magnetic tape, a removable computer diskette, a random access memory (RAM), a read-only memory (ROM), a rigid magnetic disk, an optical disc, or a combination thereof. Examples of optical discs may include, but are not limited to, a compact disc-read only memory (CD-ROM), a compact disc-read/write (CD-R/W), digital versatile disc (DVD), or a combination thereof. A computer-usable or computer-readable medium may include computer-readable memory devices, which may include any of the devices or mediums discussed above, although it excludes signals, signal transmission, and carrier waves. With regard to terminology, unless context dictates otherwise, use herein of the word "or" may be considered use of an "inclusive or", or a term that permits inclusion or application of one or more items that are linked by the word "or" (e.g., "A or B" may be interpreted as permitting just "A," just "B," or both "A" and "B").

Although subject matter has been described in language specific to structural features and/or methodological operations, it is to be understood that the subject matter defined in the appended claims is not necessarily limited to the specific features or operations described above, including orders in which they are performed.

What is claimed is:

1. A first wireless communication device comprising:
   a transceiver configured to establish existence of a first wireless channel; and
   an announcement system configured to
      determine a capability of a second wireless communication device to act as a surrogate for the first wireless communication device with respect to communication in a second wireless channel, wherein the first wireless communication device communicates with the second wireless communication device via the first wireless channel, and wherein the second wireless channel is associated with a social announcement scheme, and
      responsive to the second wireless communication device being able to act as a surrogate for the first wireless communication device with respect to communication in the second wireless channel,
         (i) request, via the first wireless channel, that the second wireless communication device perform at least one operation for the first wireless communication device over the second wireless channel in accordance with the social announcement scheme and with regard to at least one service that is available,
            an operation by the second wireless communication device including advertising, on the second wireless channel, an identification of a service that is made available by the first wireless communication device, and
         (ii) receive, from the second wireless communication device via the first wireless channel, a result of the operation, wherein the result relates to the service that is available.

2. The first wireless communication device of claim 1, wherein:
   the transceiver is further configured to institute an infrastructure wireless network using the first wireless channel to enable the first wireless communication device to function as a Wi-Fi access point (AP).

3. The first wireless communication device of claim 1, wherein:
   the announcement system is configured to indicate, via at least one of a beacon frame or a probe response frame, a desire for a second wireless communication device to act as a surrogate for the first wireless communication device with respect to communication in the second wireless channel.

4. The first wireless communication device of claim 1, wherein:
   the announcement system is configured to determine the capability of a second wireless communication device to act as a surrogate for the first wireless communication device with respect to communication in the second wireless channel based at least partially on an association request frame received from the second wireless communication device.

5. The first wireless communication device of claim 1, wherein:
   the announcement system is further configured to request that the second wireless communication device perform an operation based at least partially on a selection of the second wireless communication device from a list of devices previously determined to be capable of acting as a surrogate for the first wireless communication device with respect to communication in the second wireless channel.

6. The first wireless communication device of claim 1, wherein:
   the announcement system is further configured to request that a second wireless communication device perform an operation to discover if a service, which is indicated by the first wireless communication device to be wanted, is made available by another wireless communication device that is a participant of the social announcement scheme.

7. The first wireless communication device of claim 1, wherein:
   the announcement system is further configured to receive, from a second wireless communication device via the first wireless channel, a result of an operation, wherein the result includes an identification of a service that is discovered by the second wireless communication device to be made available by another wireless communication device that is a participant of the social announcement scheme.

8. A second wireless communication device comprising:
   a transceiver configured to establish existence of a first wireless channel and a second wireless channel; and
   an announcement system configured to
      indicate, via the first wireless channel, a capability of the second wireless communication device to act as a surrogate for a first wireless communication device with respect to communication in the second wireless channel,
      receive, from the first wireless communication device via the first wireless channel, a request to perform at least one operation for the first wireless communication device over the second wireless channel in accordance with a social announcement scheme associated with the second wireless channel,
      perform the operation for the first wireless communication device via the second wireless channel in accordance with the social announcement scheme, the operation including an advertisement of a service that is made available by the first wireless communication device, and
      report, to the first wireless communication device via the first wireless channel, a result of the operation, wherein the result relates to the service that is available.

9. The second wireless communication device of claim 8, wherein:
   the transceiver is further configured to transmit via the first wireless channel and to receive via the second wireless channel.

10. The second wireless communication device of claim 8, wherein the second wireless communication device comprises at least a portion of a mobile phone.

11. The second wireless communication device of claim 8, wherein:
   the announcement system is configured to notify the first wireless communication device of a temporary cessation of wireless communication via the first wireless channel prior to performance of the operation to act as a surrogate for the first wireless communication device with respect to communication in the second wireless channel.

12. The second wireless communication device of claim 8, wherein:
   the announcement system is configured to perform via the second wireless channel a discovery of a service that is made available by another wireless communication device of a cluster of devices that communicate on the second wireless channel.

13. A method implemented with a second wireless communication device, the method comprising:
establishing existence of a first wireless channel and a second wireless channel;
indicating, via the first wireless channel, a capability of the second wireless communication device to act as a surrogate for a first wireless communication device with respect to communication in the second wireless channel;
receiving, from the first wireless communication device via the first wireless channel, a request to perform an operation for the first wireless communication device over the second wireless channel in accordance with a social announcement scheme associated with the second wireless channel;
notifying, via the first wireless channel, the first wireless communication device of a temporary cessation of wireless communication prior to performance of the operation to act as a surrogate for the first wireless communication device with respect to communication in the second wireless channel;
performing the operation for the first wireless communication device in accordance with the social announcement scheme and with regard to a service that is available; and
reporting, to the first wireless communication device via the first wireless channel, a result of the operation, wherein the result relates to the service that is available.

14. The method of claim 13, wherein the establishing comprises:
at least one of transmitting or receiving on the first wireless channel at a particular frequency band to establish the existence of the first wireless channel; and
at least one of transmitting or receiving on the second wireless channel at the particular frequency band to establish the existence of the second wireless channel.

15. The method of claim 13, wherein the indicating comprises indicating a capability of the second wireless communication device to represent the first wireless communication device with respect to at least one of advertising or discovering a service that is announced as part of neighbor awareness networking (NAN).

16. The method of claim 13, wherein the performing comprises communicating with another wireless communication device to share available service information via the second wireless channel.

17. The method of claim 13, wherein the performing comprises communicating, via the second wireless channel, with another wireless communication device to discover a service to be made available by the other wireless communication device.

18. The method of claim 17, wherein the reporting comprises transmitting a message including an identification of the service that is discovered, as a result of the performing, to be made available by the other wireless communication device.

19. The method of claim 13, wherein the reporting comprises transmitting an action frame that includes the result of the operation.

20. The method of claim 13, wherein the notifying comprises transmitting a poll message to the first wireless communication device via the first wireless channel.

* * * * *